US010109164B2

(12) United States Patent
Brayton (10) Patent No.: US 10,109,164 B2
(45) Date of Patent: Oct. 23, 2018

(54) NOTIFICATION AND ALERT METHOD FOR PERSON(S) AND/OR DEVICES(S)

(71) Applicant: Darryl Dwight Brayton, Richland, WA (US)

(72) Inventor: Darryl Dwight Brayton, Richland, WA (US)

( * ) Notice: Subject to any disclaimer, the term of this patent is extended or adjusted under 35 U.S.C. 154(b) by 0 days.

(21) Appl. No.: 15/407,522

(22) Filed: Jan. 17, 2017

(65) Prior Publication Data

US 2018/0130321 A1    May 10, 2018
US 2018/0233004 A9    Aug. 16, 2018

Related U.S. Application Data

(63) Continuation-in-part of application No. 14/251,454, filed on Apr. 11, 2014, now Pat. No. 9,955,264.

(60) Provisional application No. 62/279,768, filed on Jan. 17, 2016, provisional application No. 61/810,712, filed on Apr. 11, 2013.

(51) Int. Cl.
| | |
|---|---|
| *G08B 1/08* | (2006.01) |
| *G08B 7/06* | (2006.01) |
| *G10L 15/26* | (2006.01) |
| *G10L 13/00* | (2006.01) |
| *H04W 88/08* | (2009.01) |
| *H04H 20/71* | (2008.01) |

(52) U.S. Cl.
CPC ............... *G08B 7/06* (2013.01); *G10L 13/00* (2013.01); *G10L 15/26* (2013.01); *H04H 20/71* (2013.01); *H04W 88/085* (2013.01)

(58) Field of Classification Search
CPC .......... G08B 7/06; H04H 20/71; H04H 20/88; H04H 60/13; H04L 47/10; H04W 72/02; H04W 88/085
USPC ..................................................... 340/539.11
See application file for complete search history.

(56) References Cited

U.S. PATENT DOCUMENTS

| | | | | |
|---|---|---|---|---|
| 6,650,897 | B2 * | 11/2003 | Nelson ............... | H04B 7/18506 455/431 |
| 6,987,947 | B2 * | 1/2006 | Richenstein ........... | H04H 20/62 381/14 |
| 7,194,235 | B2 * | 3/2007 | Nykanen ................ | H04L 47/10 455/3.01 |

(Continued)

*Primary Examiner* — John A Tweel, Jr.
(74) *Attorney, Agent, or Firm* — Eugenio J. Torres; Victor M. Rodriguez; Ferraiuoli LLC (57) ABSTRACT

Systems and methods of notification and alert activation and delivery via transmission to users wearing technology designed for single and/or multiple media types are contemplated in which (a) a communication pathway is established, for instance either a wireless receiver and/or transceiver and/or a physical (e.g., wired) connection, that (b) allows an activation method type to provide an alert/notification to one-to-many persons (i.e., users) and/or, one-to-many devices in an addressable manner. The overall method consists of devices (including for example, wearable media with external and/or integrated delivery technology) that are actively listening on a communication pathway. If an activation method is utilized over the communication pathway and an activation is designated for specific device(s) assigned within the communication pathway, then a delivery method for that device(s) is invoked that processes and delivers the non-primary media (audio and visual) based on the command type, any local settings and the media type transmitted.

24 Claims, 5 Drawing Sheets

(56) References Cited

U.S. PATENT DOCUMENTS

| | | | | |
|---|---|---|---|---|
| 7,221,928 B2* | 5/2007 | Laird | ............ | A61B 5/04 |
| | | | | 340/539.12 |
| 8,108,895 B2* | 1/2012 | Anderson | ............ | G06Q 30/02 |
| | | | | 705/14.4 |
| 9,350,770 B2* | 5/2016 | Yang | ............ | H04W 24/08 |
| 9,420,431 B2* | 8/2016 | Swanson | ............ | H04W 4/046 |
| 9,632,746 B2* | 4/2017 | Keipert | ............ | G06F 3/165 |
| 2008/0090524 A1* | 4/2008 | Lee | ............ | H04W 84/20 |
| | | | | 455/41.2 |

* cited by examiner

NOTIFICATION AND ALERT METHOD FOR PERSON(S) AND/OR DEVICES(S)

RELATED APPLICATIONS

This application claims priority from U.S. Provisional Application 62/279,768, filed on Jan. 17, 2016, the contents of which are fully incorporated by reference.

BACKGROUND OF THE DISCLOSURE

Field of the Disclosure

The field of the invention is devices and methods for personal alert and notification and/or device-based alert and notification.

Background of the Invention

With today's advanced technologies, one can actually be isolated from basic security and/or notification and alerts; take for example, a fire and smoke detector alarm. Further, take the example of a 'gaming' PC application. A person(s) playing a game, like the X-Box™ by Microsoft®, may be wearing headphones for optimal game experience (wired or wireless) and watching a flat panel-type TV screen with game graphics—and fully absorbed and oblivious to the surroundings. However, the efficiency of the headphones to (a) reduce external sound via the earmuff design and (b) optimize the hearing performance for game interaction, make external communication with the user practically impossible by any distance other than a few feet, and would certainly muffle even fire and smoke detector alarms. A far more practical example, though, is a simple notification of a parent calling to a child that dinner is ready (note that notifications could also be informational, or entertaining in nature, i.e., a tweet, etc.—this parent may have to literally tap the person on the shoulder, perhaps having to go up/down a flight of stairs to accomplish this. And, if this is repeated night after night, then a solution is needed. Application US2016330538 by Eskenas, titled Audio Interrupter Alertness Device for Headphones, attempts to solve some of the problems recited above. Eskenas discloses an audio interrupter device that interfaces between an audio source and headphones to momentarily stop sound transmission to alert the user of an external sound above a threshold. However, this method does not perform encoding and decoding of data into an alert and communicate the same through an alert channel; that is, its method does not anticipate having processors and/or functions that process text-to-speech or allow live text feeds to be interpreted and then broadcasted as voice, or allow synchronized interruption with transmission of audible voice or tones.

However, these devices currently do not perform encoding and decoding of data into an alert and communicate the same through an alert channel; that is, these also do not have processors and/or functions that process text-to-speech or allow live text feeds to be interpreted and then broadcasted as voice, or allow synchronized transmission of audible voice or tones.

Personnel trying to describe an emergency situation over a live Public Address (PA) announcement over a siren system and not trained in broadcasting and/or public emergency message construction and practices/methods would most likely be very hard to hear and therefore, understand. And these sirens could then also be equipped with reader-boards and/or strobe lights that could be coordinated with text messages to direct their activities.

Therefore, while numerous devices and methods for notification and alert are known in the art, none have yet integrated a non-primary notification and alert method that allows either remote and/or injection of multiple media (audio and/or visual) based on the system configuration for person(s) and/or device(s). Therefore, there is still a need for improved systems and methods, such as the method defined in this patent application that provides notification and alert to members of local groups, like families with new game technologies, but also, using the same method defined herein, notification and alert to members of the general public through more established technologies like sirens, strobes, and reader-boards.

SUMMARY OF THE DISCLOSURE

A method and system for delivering an alert to a remote device, for example, a wearable device, is disclosed. The wearable device includes a primary media channel that behaves exactly as intended for the wearable device. For instance, if the wearable device is a headphone, the primary media channel reproduces sound through the headphone speakers. However, the wearable device also includes a non-primary channel used for delivery of an alert and notification. When an alert or notification is sent (via a command type through the communication pathway) a non-primary channel is activated in the wearable device to call attention to the user that an alert or emergency or notification is activated.

DETAILED DESCRIPTION OF THE INVENTION

Figure 1:
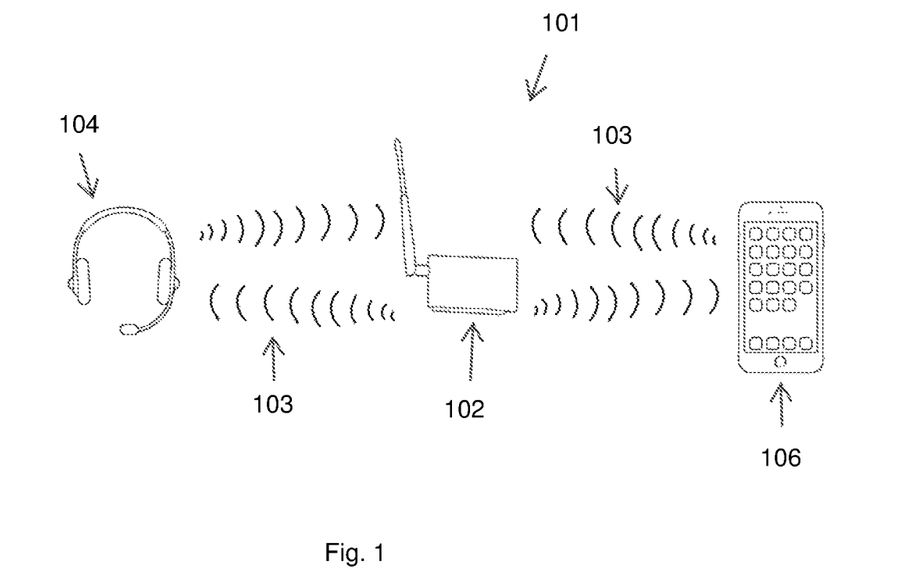
FIG. 1 shows an embodiment of the present system in accordance with the principles of the present disclosure.
Figure 2:
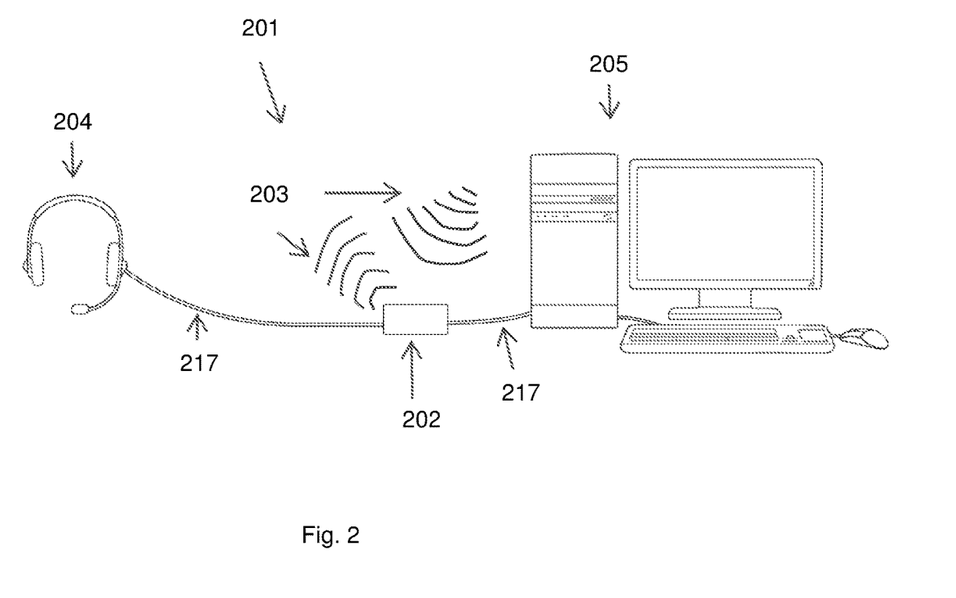
FIG. 2 shows another embodiment of the present system in accordance with the principles of the present disclosure.
Figure 3:
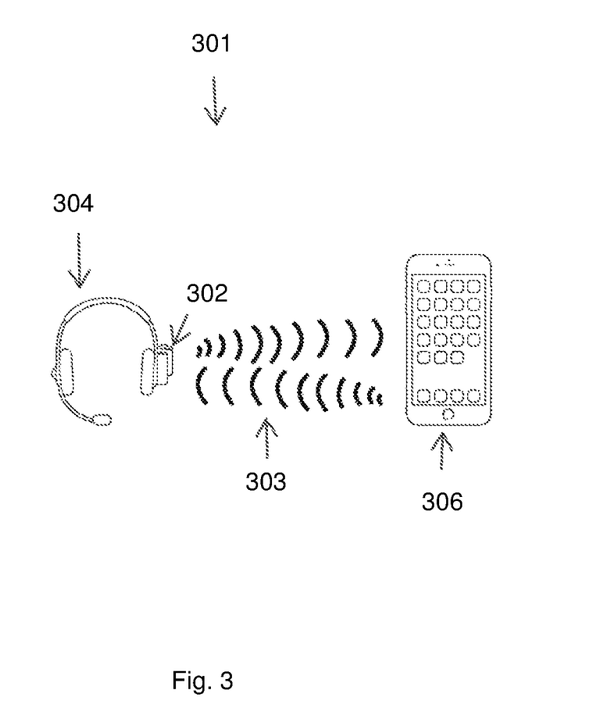
FIG. 3 shows another embodiment of the present system in accordance with the principles of the present disclosure.

As shown in FIGS. 1, 2, and 3, the various embodiments of the systems 101, 201, and 301 comprise devices 102, 202, and 302 connected via communication pathways 103, 203, and 303, most typically, a few feet up to an unlimited distance of miles in nature, and again either wired 217 or wireless 103, 203, and 303, as long as a communication path can be established (e.g. telecom networks, cellular networks, radio networks of various types including Bluetooth, Internet, Intranet, cable television, satellite, other telecommunications and/or data highway technologies, and/or direct connection with cabled, wiring, fiber optic, and others). In these cases, the user (person) is typically utilizing a piece of wearable technology gear, such as wired 204 or wireless 104 and 304 headphones/headsets or other wearable devices such as ear buds, moldable ear inserts, bracelets, rings, pendants, ear-rings, hearing aids, bone conduction methods, vibration, bionics, or virtual reality headsets that would allow either audible transmission of alerts (hearing) and/or visual transmission of alerts (seeing) via images either as overlays on a screen, and/or new screen displays that are images/videos, and/or both audible/visual. The alert and notification delivery method is the method that produces the alert and notification when it receives the correct trigger via an activation method by an automated system and/or manually via another person.

The delivery method to this person (via the user's wearable gear and/or screen display and/or head-ups screen worn on the face) is to deliver the appropriate sound/visual, alert and notification based upon a trigger command that is parsed, and if required, then either passes that alert and notification media type (i.e., sound and/or visual) and passes back a response to the activator, as required. It is important to note that the delivery method may be: (a) integrated on-board the targeted person wearable alert and notification gear (WAG™) and/or device, as shown by element 302 in FIG. 3; and/or (b) attached externally between the device 202 and a primary (non-alert and notification) media generator 205 as shown in FIG. 2, with an option to incorporate a device that generates the alert and notification audio/images within itself (not shown); and/or (c) be incorporated independently from the device that generates the primary (non-alert and notification) media, as shown by element 102 in FIG. 1; and/or (d) be fully incorporated into the device that would then generate both the primary (non-alert and notification) and the alert and notification media (audio and visual) for persons and/or devices (not shown). The delivery method engages when the activation method instructs it to, otherwise the primary audio and visual signals are sent and passed through unimpeded.

As shown in FIGS. 1 and 3, the activation method is received from an activation device 106 and 306, respectively, connected through a communication pathway to the person and/or device with addressing and communication protocols to achieve definitive communication and control for a desired target person(s)/device(s).

A specific control string and data (control data and/or audio signal, and/or text and/or visual data) would be input into the activation method, processed and then sent over the communication pathway to person/device whose delivery method is actively listening for an incoming alert and notification signal addressed to them. If the correct device is listening, it would then process the incoming media as instructed according to: (a) the type of control string and data and (b) the type of media, with (c) gathering of potential and optional feedback to the activation method.

Figure 4:
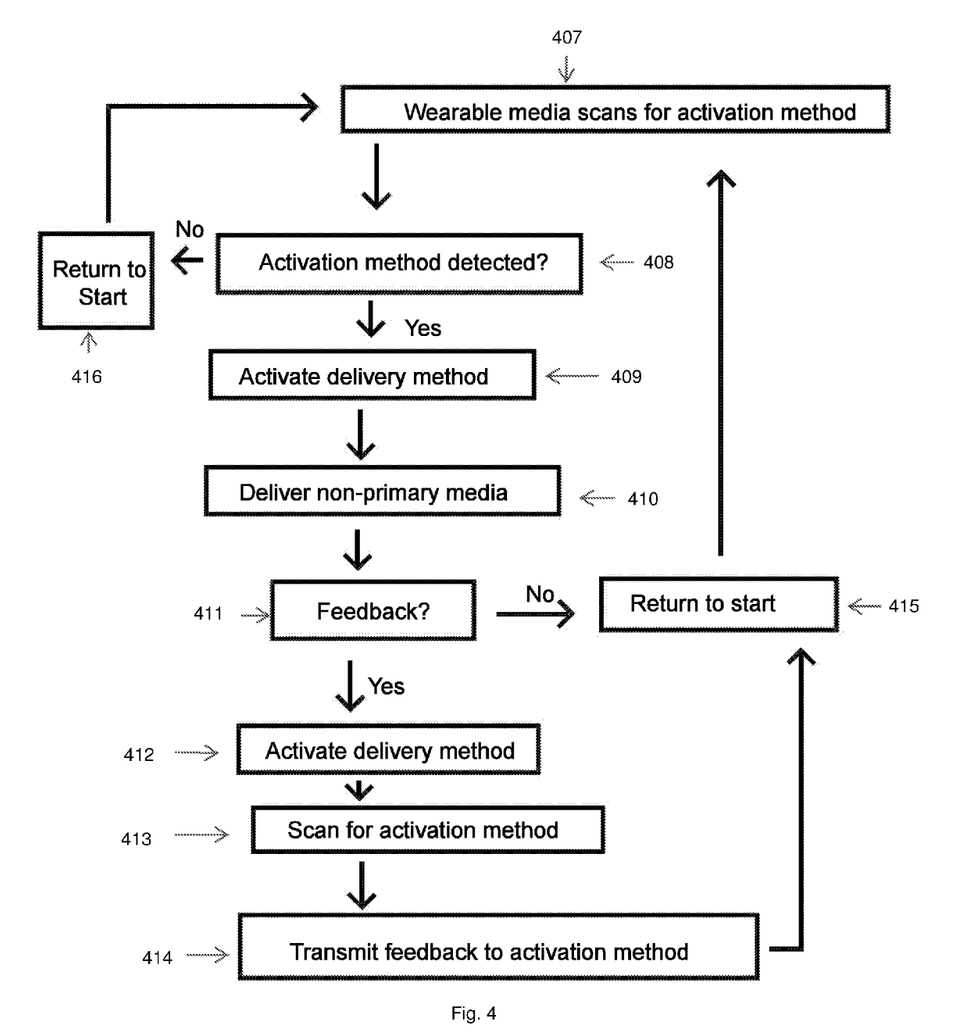
FIG. 4 shows an exemplary flowchart of an embodiment of the present method in accordance with the principles of the present disclosure.

FIG. 4 is an exemplary flowchart of the present method as shown in FIG. 3. In step 407 the wearable media is actively scanning on a communication pathway. As shown in step 408, if an activation method is utilized over the pathway and is designated for a specific device assigned to the communication pathway, the activation method is detected. If no activation method is detected, step 416 returns the process to its original state, and the wearable media continues to scan for an activation method. If an activation method is detected, step 409 invokes the delivery method for the device that processes and delivers the non-primary media (audio and/or visual), as shown in step 410, based on the command type, any local settings and the media type transmitted. As shown in step 411 the device may optionally respond to confirm that the alert and notification was received, or to provide feedback of other type to the activation method device, including confirmation of reception, GPS coordinates, person needing assistance, a local function button was pushed, etc. Steps 412 through 414 disclose an embodiment of a process for providing feedback to the activation method device. As shown in step 411, if no feedback is provided, step 415 returns the process to its original state, and the wearable media continues to scan for an activation method.

In another exemplary embodiment, take for example a 'gaming' PC application, as shown in FIG. 2. For example, a user playing a console video game, such as the X-Box™ by Microsoft®, may be wearing headphones for optimal game experience (wired or wireless) and watching a flat panel-type TV screen with game graphics. However, the efficiency of the headphones to (a) reduce external sound via the earmuff design and (b) optimize the hearing performance for game interaction, make external communication with the user practically impossible by any distance other than a few feet. For example, a parent calling to a child that dinner is ready may have to literally tap the person on the shoulder, perhaps having to go up/down a flight of stairs to accomplish this.

In this embodiment, a person would wear headphones/headset 204 that would plug directly into the audio output channel of the gaming device 205 (e.g., X-Box™ by Microsoft® and/or PC). The gaming device 205 could be stand alone or could be connected to a network, such as the internet. In one specific embodiment of the methods described, but certainly not limited to this arrangement, one may insert a wireless delivery method within device 202 (e.g., Wi-Fi), in-line and inserted/connected with cables between the gaming headphones 204 and the PC's (205) audio output channel, but with an integrated wireless transceiver internal to device 202 to establish a communication pathway 203, as described, with an activation method, thus, to implement a wireless notification and alert activation and delivery method via a wired delivery 217 of non-primary media method. The gamer (read: person) would only hear the wired primary media (not any alert and notification, that is normal game experience) audio and/or visual until an activation was received from the wireless activation method and delivered in a wired manner directly to the headphones 204 to the person. That is, a person plays the game and everything is game-centric, until an alert and notification is received through the communication channel 203 and delivered to the headphones/headset 204 by the delivery method within device 202 through the wired delivery 217.

Figure 5:
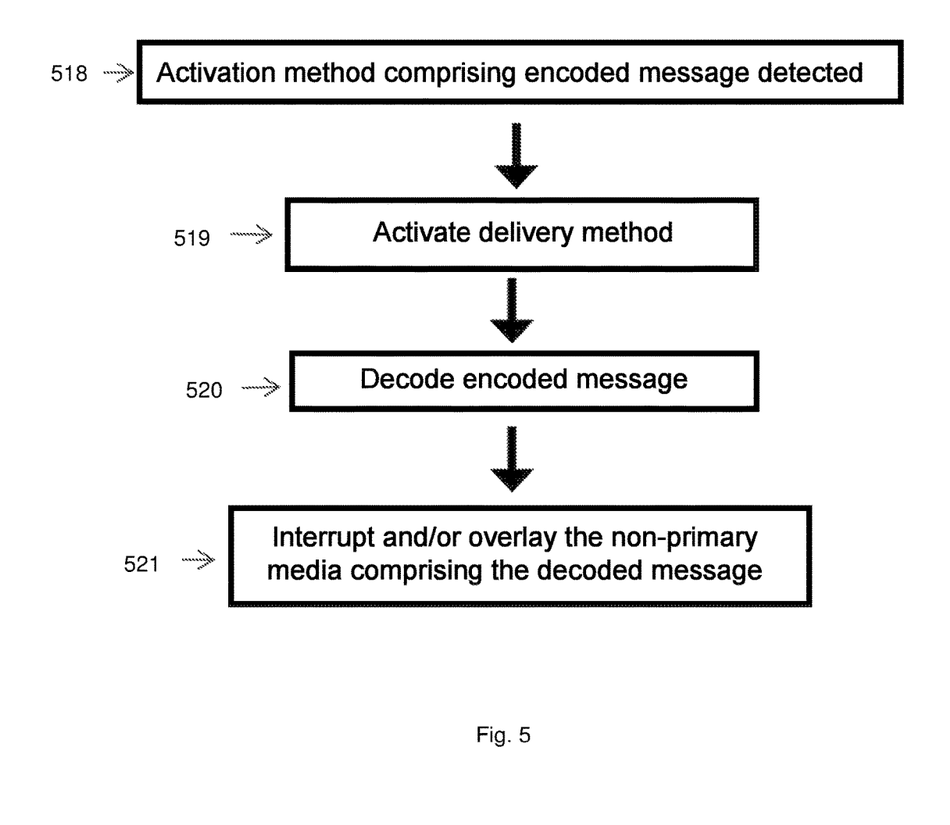
FIG. 5 shows an exemplary flowchart of an embodiment of the present method in accordance with the principles of the present disclosure wherein an encoded message is decoded.

For this particular embodiment for a wireless activation method, consider a text-message sending device 106 or 306 (like an Apple® iPhone™ or Google® Android-based phone) a voice-activated application (like Siri™ voice assistant by Apple™, Amazon Echo™ Google Home™, other speech to text application like Nuance™ brand applications), keyboard keyed text, (or shortcut keyed text, etc.) that transmits an activation method. As shown in FIG. 5, the activation method comprising an addressed command with associated data, control data, encoded text and/or audio/visual media to a specific device 102, 202, or 302 is detected in step 518. Step 519 activates the delivery method and step 520 enables the decoding of the text and/or audio/visual media into a live voice communication to the user and/or (b) a text message that is received and then converted to either speech and/or a pre-recorded voice message and/or a pre-recorded alert tone to that person(s), and/or (c) a command message that is received and then converted to either speech and/or a pre-recorded message and/or a pre-recorded alert tone to the user. Step 521 then interrupts and/or overlays the decoded text and/or audio/visual media.

One advantage of the decoding feature, is that the quality of the encoded message can be increased by the decoding process. For example, human emotion may make a message unclear or may cause anxiety in the user; for example, a "stressed-out" parent ordering a child in an elevated voice to get ready for school. The decoding step could transform the message into a non-agitated command.

Another advantage of the decoding feature is that standard-type voice or text messages could be decoded into standard-type media. For example, a text message of just the letters "LOV" could be decoded into audio media saying "I LOVE YOU". This standard-type elements would simplify communication between users of the system. Similarly, a command string that is decoded by looking up what alert and notifications to process.

Note that if the delivery method was fully incorporated into the device that generates both the primary (non-alert and notification, game graphics/sound/media in this case) and the non-primary alert and notification media (audio and visual), then a flat panel-type TV screen message and/or visual display (static and/or dynamic) and/or an audible alert and notification could both be generated. This would be useful in next generation virtual reality devices that combine audio and visual communication methods.

In any case, a person is alerted and notified to an event that is happening, from the mundane of "dinner is ready come and get it," to the extreme, "there is a house fire, get out"—and therefore messages and activations could be manually generated and/or automatically generated (say like a fire and smoke detector alarm in a home connected to the activation and delivery method). In the case of the fire and smoke detector alarm, a device sensor (smoke detector alarm) would automatically sense the fire and activate the appropriate control code to any and all devices in the proximity and/or jurisdictional model as a 'global' or 'multicast' alert and notification to all person(s). In this embodiment, the smoke detector could be programmed to function as the activation or delivery device. It will be apparent to those skilled in the art that the smoke detector alarm could be programmed to be both the activation and delivery device. A person could then optionally acknowledge the message locally and/or to further notify a fire department as to the fire, its location and proximity by GPS coordinates for response, if so equipped. Settings in delivery method device(s) would then either let the person(s) and/or device(s) acknowledge to cancel the alert and/or ignore the alert and/or disable the acknowledge function making further participation in the game nearly impossible and/or not enjoyable until cancelled by other means (for instance, cancel by the alert and notification activation method initiator and/or a watchdog and/or a timer timeout).

Alternately, the wireless example could have a wired delivery method, for example from a PA/other console system in the house that plugged directly into the delivery method implementation and/or a PA/other console system in the house that is connected wirelessly into the delivery method implementation. Or it could embody both methods (wired and/or wireless communications to the activation method).

As shown in FIG. 1, consider the case of wireless headphones 104. For this instance, instead of cabling from the headsets, a wireless connection 103 akin to a wireless router could be employed in the delivery method device 102 to process both the activation method (sent command/control and associated media) from the activation device 106 to route it to the appropriate device 104 via the Wi-Fi and/or Bluetooth and/or other local transmission 103.

In one embodiment, a wireless delivery method device would hold the delivery method and processing of the activation method addressing, signal and media—this could then be (a) integrated, as element 302 of FIG. 3, into the overall design of the wireless headphones/headset 304; and/or (b) it could be another wireless device, like element 102 of FIG. 1, that the wireless headphones/headset 104 is paired with—that is, the audio output via WI-FI and/or Voice over Internet Protocol (VoIP) is sent from the audio generation device (e.g., game device and/or Personal Computer) DIRECTLY to a wireless alert and notification delivery method device and then transmitted via pairing to the gaming headphones/headsets.

The alert and notification activation from the activation method device to the wireless delivery method device is via pairing/connecting with its particular internal radio (i.e., Bluetooth, Zigbee, WI-FI, FRS, other radio type/frequency, etc.) and/or direct pushbutton on the device and/or wired remotely (e.g., contact closure, PLC, PA, audio console, sensor, etc.), and/or other electromagnetic method and/or photo-optic method. In performing this connection, then a cell phone having texting capabilities, could have an application that allows (a) pairing to the wireless delivery method device system/integrated component and that (b) application sends a text message via, for example SMS, to the wireless delivery method device. Once received, the wireless delivery method device would interrupt and/or overlay the incoming message (voice, text to speech, control message, visual media) onto the regular audio/visual input stream to deliver the message to the headphone/headset. If so fitted with a microphone, the person could also (a) press a key and/or (b) say 'on the way' and the wireless notification device would wait for/listen for this feedback and convert either a button push and/or utilize speech-to-text with voice recognition and send back to the activation method device for further action (or not).

An aspect that is apparent is that the wireless headsets (or if implemented as such in a PA type device) could also integrate the delivery method device(s) within the wireless headset(s) (or PA device) rather than as an external independent delivery method device(s). This would allow direct delivery to the person's wearable alert and notification (NOTE from ddb, consistent throughout) technology/gear (WAG™) wireless headsets/devices and also be used as routers of alert and notification control and/or data and/or media and/or response to other wireless person(s)' headsets/devices, and/or also as primary repeaters, and other wireless headsets (or devices for the non-person case) could act as secondary repeaters of alert and notification control and/or data and/or media and/or response with back-up router responsibility for a fault-tolerant local-network of alert and notification for multiple persons (users)/devices.

In another example, a parent missing their family could be calling from an airport about ready to leave for a trip and wants to say goodbye to his family—who are engaged in a gaming battle on-line. The parent calls in to an application that routes him/her to the headset and cuts in for him/her to either talk to right there, and if the person(s) wearable technology have microphones to acknowledge, and/or to cut-in and speak a message to tell a person(s) to call him/her.

In another example, a parent is driving home from work and wants to remind the kids of dentist appointments and to get ready to leave before she gets there. No one answers the phone so a text is sent to the headset from the car while driving to interrupt their gaming session or their listening to music, and tells them to get ready. If the person(s) have microphones then they can acknowledge.

In another example, for factory safety, an individual is in a geo-coded danger zone inadvertently that is high noise and is wearing hearing protection earmuffs and radio with boom microphone, with an integrated delivery method device in addition to regular radio communications. An automated system at the activation point on the same wireless communications channel, monitors position feedback sent from the integrated delivery method device GPS in the headset that its integrated, and when a geo-coded restricted area 'fence' is encountered, the activation method sends back an emergency notification and alert to that person's integrated hearing protection headphone delivery device saying to clear the area, and then sends a notification and text alert to emergency personnel, including the person's GPS position to potentially locate and evacuate this worker. If a person(s) has a microphone then they can acknowledge to the base operations or simply move out of that area.

In another example, for industrial safety, an individual is in a high noise chemical area and is wearing hearing protection earmuffs with wireless receiver (but this could also be a licensed/unlicensed radio with talk-back microphone), with an integrated delivery method device in addition to regular radio communications. An automated system at the activation point on the same wireless communications channel, monitors dangerous levels of a chemical, for example ammonia (NH3). Upon sensing the ammonia, and sending an input to the activation method, the activation method sends an emergency notification and alert to that person's integrated hearing protection headphone delivery device saying to immediately evacuate the area, and then sends a notification and text alert to emergency personnel. If a person(s) has a microphone then they can acknowledge to the base operations or simply evacuate that area. GPS could also be integrated into the delivery method device of this particular application.

These embodiments for automatic initiation of the notification and alerts could also be tied into external systems to initiate the activation method device, such as a NOAA (National Oceanic and Atmospheric Association) feed for weather; like tornados, storms, hurricanes, winter storms and/or Amber Alerts and/or other outside automated subscription-type activations, like Common Alerting Protocol (CAP) and similar.

Typically, the notification and alert delivery method device(s) is located in a defined notification zone (e.g., a block, a town, a city, a county, larger to an unlimited distance of miles—if the communications channel is by means like the Internet and/or wireless repeaters and/or cell phone towers and/or telephone cables and/or fiber optic connections and/or satellites and/or other wired connections) and/or in a specified proximity (e.g., a home, a dorm, a stadium) accessible by the activation methods device(s) employed for that particular communications topology.

It will be apparent for persons skilled in the art that other variations of these embodiments could be constructed according to the state of the art and the teachings in this disclosure. For example, the wearable alert and notification gear could function as a repeater to other wearable alert and notification gears. Also, in another embodiment, an alert and notification that is playing could be itself interrupted by higher level alert and notification if these are actively playing.

The disclosure is not limited to the precise configuration described above. While the disclosure has been described as having a preferred design, it is understood that many changes, modifications, variations and other uses and applications of the subject invention will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

What is claimed is:

1. A system for alert and/or notification comprising:
    a wearable media comprising a primary media channel and a non-primary media channel,
    said wearable media operatively connected to an activation device via an addressable communication pathway,
    said wearable media comprising a notification protocol;
    wherein said notification protocol is initiated via a command trigger by the activation device;
    wherein said notification protocol is configured to receive digital media and encode it as a notification or alert;
    wherein said wearable device is configured to decode and play back said digital media encoded as a notification or alert via the non-primary media channel when the notification protocol is initiated.

2. The system of claim 1, wherein the command trigger comprises a representation of an alert and/or notification to be reproduced via the non-primary media channel.

3. The system of claim 1, wherein the non-primary media channel is text-based.

4. The system of claim 1, wherein the non-primary media channel is audio-based.

5. The system of claim 4, wherein the notification protocol comprises a decoding module; and
    wherein the decoding module is configured to modify at least an element of an audio alert and/or notification according to a preestablished attribute.

6. The system of claim 2, wherein the notification protocol comprises a text-to-voice capability, wherein the alert message is a text message and the alert is an audio message.

7. The system of claim 2, wherein the notification protocol comprises a voice-to-text capability, wherein the alert message is a voice message and the alert is a text message.

8. The system of claim 2, wherein the non-primary media channel is text and audio based.

9. A method for alert and/or notification comprising the steps of:
    operatively connecting a wearable media comprising a media channel and a non-primary media channel with an activation device via an addressable communication pathway;
    receiving in said wearable media a command trigger from said activation device;
    initiating a notification protocol in said wearable media;
    receiving digital media;
    encoding said received digital media as a notification or alert; and
    decoding and playing back said digital media encoded as an alert and/or notification via the non-primary media channel when the notification protocol is initiated.

10. The method of claim 9, wherein the command trigger comprises a representation of an alert and/or notification to be reproduced via the non-primary media channel.

11. The method of claim 9, wherein the non-primary media channel is text-based.

12. The method of claim 9, wherein the non-primary media channel is audio-based.

13. The method of claim 12, wherein initiating the notification protocol comprises modifying at least an element of the audio alert and/or notification according to a preestablished attribute before reproducing the alert and/or notification.

14. The method of claim 10, wherein the notification protocol comprises a text-to-voice capability, wherein the alert message is a text message and the alert is an audio message.

15. The method of claim 10, wherein the notification protocol comprises a voice-to-text capability, wherein the alert message is a voice message and the alert is a text message.

16. The method of claim 10, wherein the non-primary media channel is text and audio based.

17. A computer readable media comprising instructions to:
  operatively connect a wearable media comprising a media channel and a non-primary media channel with an activation device via an addressable communication pathway;
  receive in said wearable media a command trigger from said activation device;
  initiate a notification protocol in said wearable media;
  receive digital media;
  encode said received digital media as a notification or alert; and
  decode and play back said digital media encoded as an alert and/or notification via the non-primary media channel when the notification protocol is initiated.

18. The computer readable media of claim 17, wherein the command trigger comprises a representation of an alert and/or notification to be reproduced via the non-primary media channel.

19. The computer readable media of claim 17, wherein the non-primary media channel is text-based.

20. The computer readable media of claim 17, wherein the non-primary media channel is audio-based.

21. The computer readable media of claim 20, wherein the notification protocol is configured to modify at least an element of the audio alert and/or notification according to a preestablished attribute before reproducing the alert and/or notification.

22. The computer readable media of claim 18, wherein the notification protocol comprises a text-to-voice capability, wherein the alert message is a text message and the alert is an audio message.

23. The computer readable media of claim 18, wherein the notification protocol comprises a voice-to-text capability, wherein the alert message is a voice message and the alert is a text message.

24. The system of claim 1, wherein said wearable device is configured to be disabled via a command trigger by the activation device.

* * * * *